(No Model.) 4 Sheets—Sheet 1.

G. S. DUNCAN.
CABLE GRIPPER.

No. 462,378. Patented Nov. 3, 1891.

Witnesses.
Henry Orth Jr.
B. W. Sommers

Inventor.
George Smith Duncan
per Henry Orth
Atty (No Model.) 4 Sheets—Sheet 2.
G. S. DUNCAN.
CABLE GRIPPER.
No. 462,378. Patented Nov. 3, 1891.
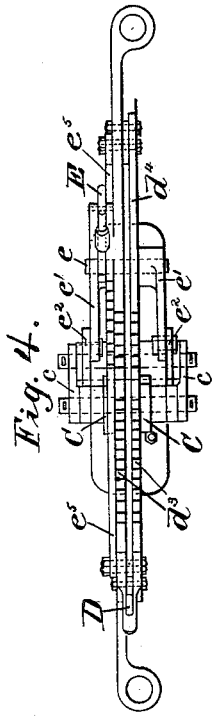
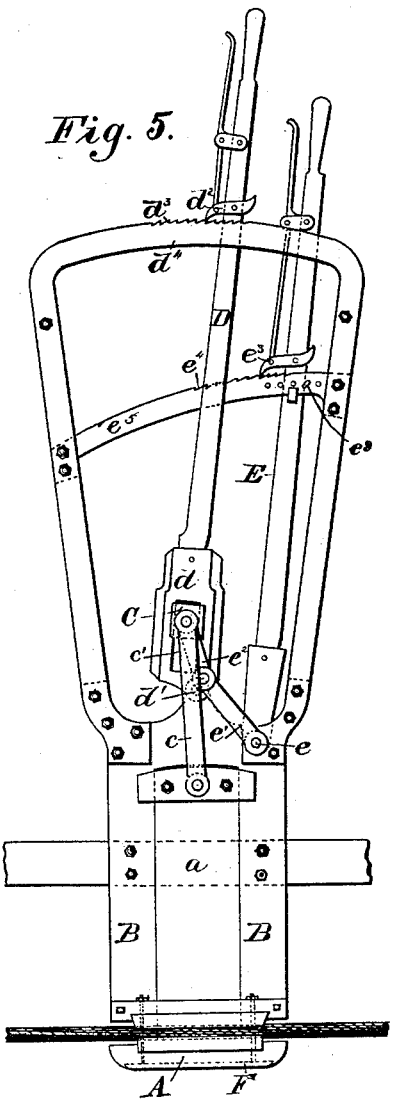
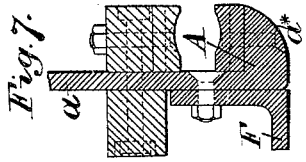
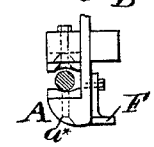
Witnesses.
Inventor.
George Smith Duncan
per Henry Orth
Atty (No Model.) 4 Sheets—Sheet 3.

G. S. DUNCAN.
CABLE GRIPPER.

No. 462,378. Patented Nov. 3, 1891.

Witnesses
H. Dieterich
P. W. Sommers

Inventor
George S. Duncan (No Model.) 4 Sheets—Sheet 4.

G. S. DUNCAN.
CABLE GRIPPER.

No. 462,378. Patented Nov. 3, 1891.

Witnesses:
H. G. Dieterich
P. W. Sommers.

Inventor:
George S. Duncan,
Henry Orth
Atty.

UNITED STATES PATENT OFFICE.

GEORGE SMITH DUNCAN, OF MELBOURNE, VICTORIA.

CABLE-GRIPPER.

SPECIFICATION forming part of Letters Patent No. 462,378, dated November 3, 1891.

Application filed August 25, 1890. Serial No. 363,046. (No model.) Patented in Victoria March 13, 1890, No. 7,580; in New South Wales March 15, 1890, No. 2,086; in South Australia June 24, 1890, No. 1,632; in Tasmania June 27, 1890, No. 830; in England July 13, 1890, No. 11,933, and in Queensland October 2, 1890, No. 1,047.

*To all whom it may concern:*

Be it known that I, GEORGE SMITH DUNCAN, civil engineer, a subject of the Queen of Great Britain, residing at Melbourne Chambers, Little Collins Street, Melbourne, in the British Colony of Victoria, have invented new and useful Improvements in and Relating to Cable-Grips, (for which I have obtained Letters Patent in the following British colonies: Victoria, patent dated March 13, 1890, No. 7,580; New South Wales, patent dated March 15, 1890, No. 2,086; Queensland, patent dated October 2, 1890, No. 1,047; South Australia, patent dated June 24, 1890, No. 1,632; Tasmania, patent dated June 27, 1890, No. 830; and in Great Britain, patent dated July 13, 1890, No. 11,933,) of which the following is a specification.

This invention relates to cable-grips for cable-roads—that is, for those roads in which the propelling power is communicated from the engine to the vehicle through the medium of a cable traveling in a subway or underground conduit.

The invention consists in structural features and in combinations of parts, as will now be fully described, reference being had to the accompanying drawings, in which—

Figure 1:
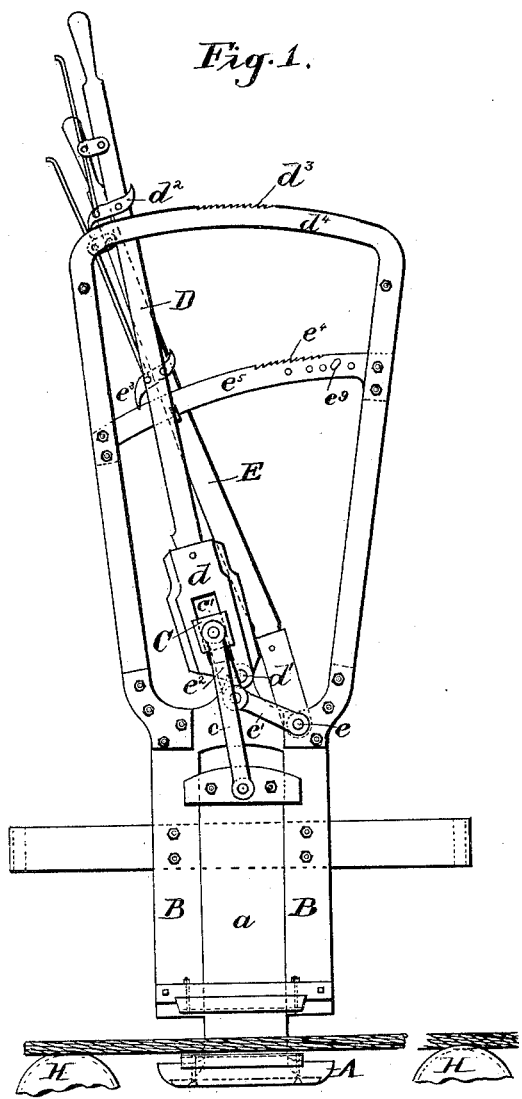
Figure 2:
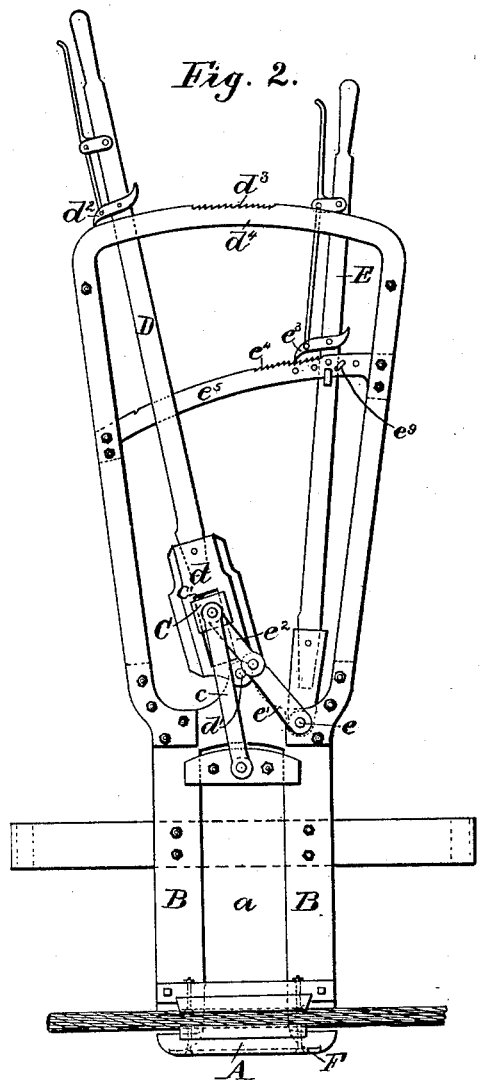
Figure 6:
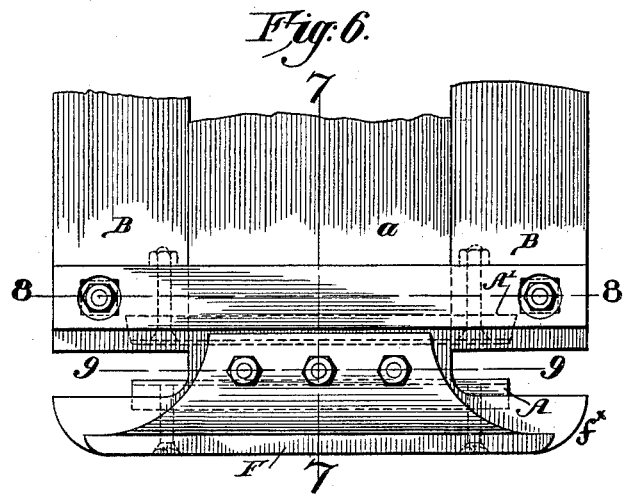
Figure 10:
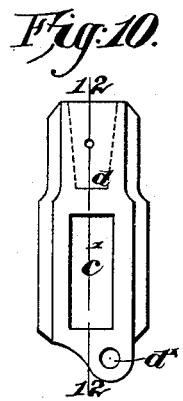
Figure 8:
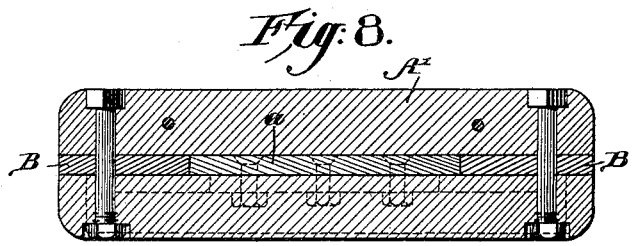
Figure 11:
Figure 9:
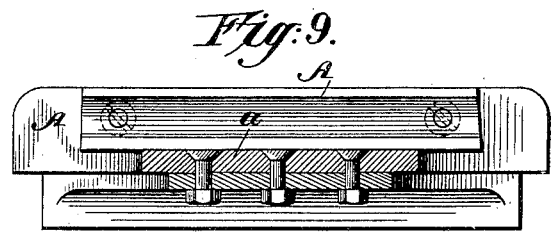
Figure 12:
Figure 13:
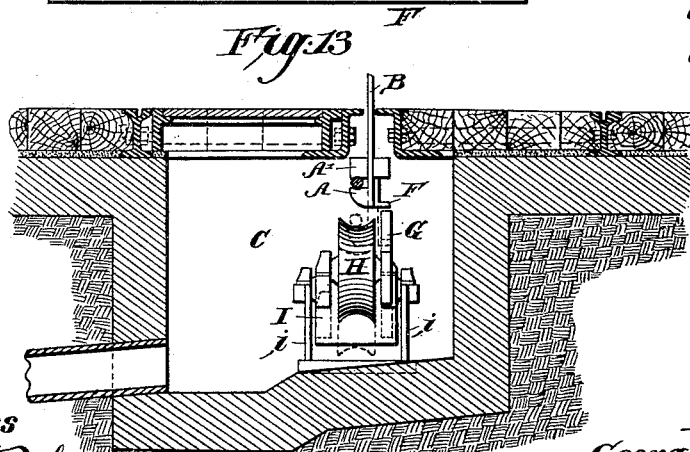
Figure 14:
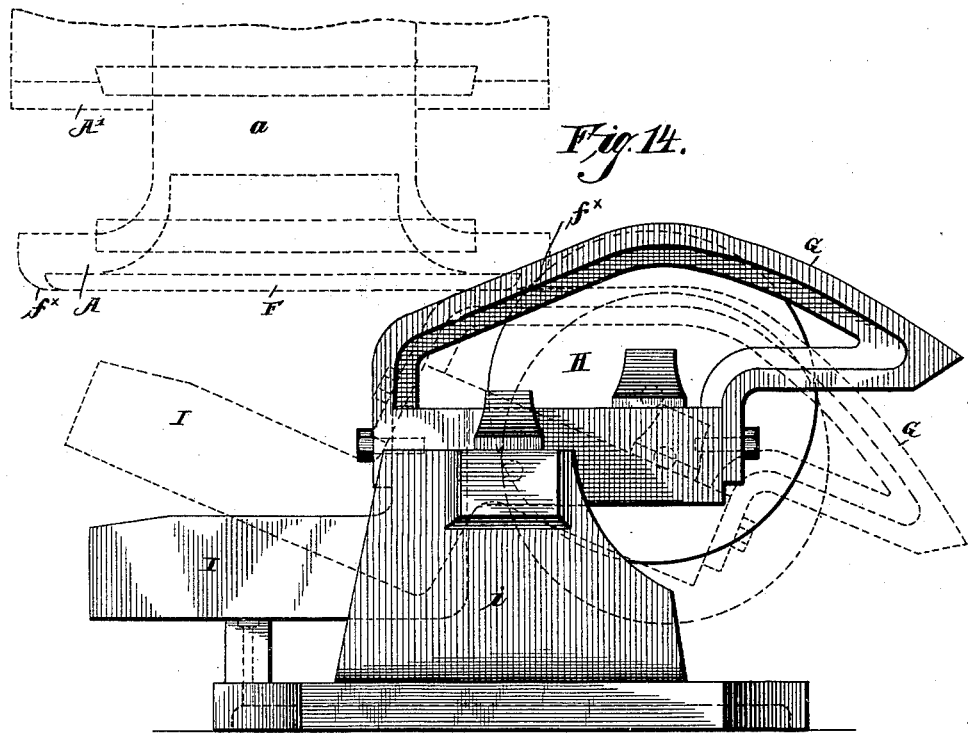
Figure 15:
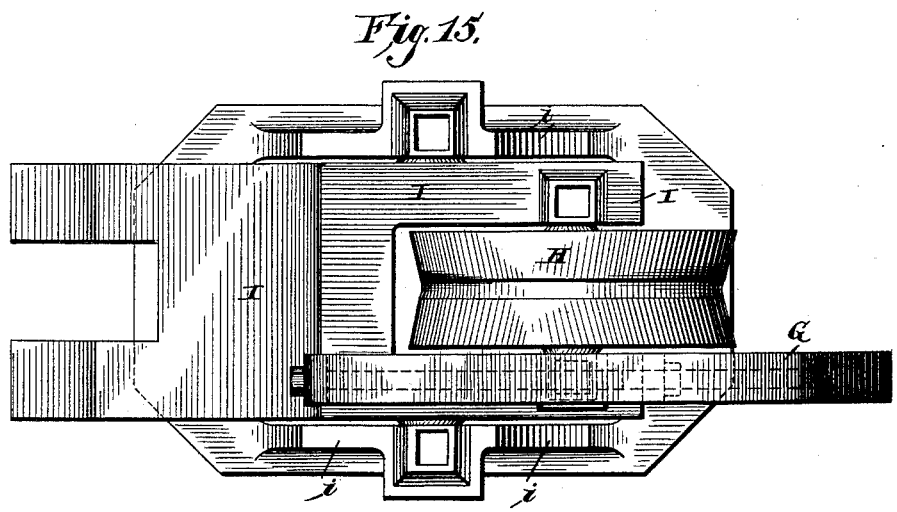

Figure 1 is a front elevation of my improved cable-grip, illustrating same with its movable gripping-jaw in its lowest or cable-releasing position. Fig. 2 is a similar view, but illustrating said grip as having picked up the cable; and Figs. 3 and 4 are respectively an end elevation and a plan of said grip with its parts in the position illustrated in Fig. 2. Fig. 5 is a side elevation of the grip, illustrating the parts as they would be when the cable is tightly gripped—that is, when the main gripping-lever has been operated. Fig. 6 is a side elevation of the lower part of my improved grip, illustrating the combination therewith of a lateral bar or arm when the grip is used on roads provided with balanced cable-carriers for the purpose of depressing the cable-carrier and allowing the grip to clear the same. Fig. 7 is a vertical transverse section on line 7 7, Fig. 6. Fig. 8 is a horizontal section on line 8 8, Fig. 6; and Fig. 9 is a horizontal section on line 9 9, Fig. 6. Figs. 10 and 11 are respectively a side elevation and an edge view of the shoe into which the lower end of the main operating-lever is fitted; and Fig. 12 is a vertical central section on line 12 12, Fig. 10. Fig. 13 is a cross-section of the permanent way of a cable-tramway system fitted with my rocking cable-supporting pulleys and constructed for use with my improved cable-grip; Figs. 14 and 15 the yielding cable-supporting devices in side elevation and top plan, respectively.

Similar letters of reference indicate the same parts in all the figures.

A represents the lower gripping-jaw, which is, according to my invention, either secured to or else is made integral with a central plate $a$, adapted to slide up and down within the fixed framing B of the grip in the ordinary manner, and A' is the fixed jaw secured to said framing in the ordinary manner. The upper part of the central vertically-sliding plate $a$ is connected by a pair of links $c\ c$ with a block C, which is capable of sliding freely up and down within a groove $c'$, formed in a shoe $d$, into which the lower end of the main operating-lever D is fixed in any convenient manner. The lower end of the shoe $d$ is pivoted at $d'$ to some convenient part of the framing B of the grip, while the main operating-lever D is provided near its upper end with a small spring-retaining catch $d^2$, adapted to engage in teeth or serrations $d^3$, formed in the upper surface of a quadrant $d^4$, secured to the upper part of the fixed framing of the grip somewhat in the ordinary manner.

E represents the cable-lowering and picking-up lever hereinbefore mentioned, which said lever is pivoted at $e$ to some convenient part of the framing B, preferably adjacent to the pivoted end $d'$ of the shoe $d$. Said lever is, moreover, provided at its lower end with a pair of crank-arms $e'$, which may be formed integral with or may be secured directly to said lever, or else may be keyed or otherwise secured to the pin or spindle $e$, upon which said lever turns. The outer ends of these crank-arms $e'$ are connected by links $e^2\ e^2$ with the sliding block C, to which, as above mentioned, the adjustable jaw-carrying plate $a$ is also connected. The upper end of the cable-lowering and picking-up lever E is provided with a small spring-retaining pawl or catch $e^3$, adapted to engage with the teeth or serrations $e^4$, formed in the upper surface of the quadrant $e^5$, which is preferably provided with adjustable stops $e^9$ to limit the movement of the lever E, said stop being inserted into one of the holes formed in the quadrant, whereby the throw of said lever may be varied, as clearly shown in Figs. 1, 2, and 5. The lower side of the lower gripping-jaw A is by preference rounded off, as illustrated at $a^x$, (see Figs. 3 and 7,) in order to facilitate the picking up of the cable, thus obviating the necessity for forming kinks in the latter whenever it is desired to lead the cable into or out of the jaws of the grip, as will be well understood. Either to the end of the vertically-sliding plate $a$, as shown, or else to the front of the lower gripping-jaw A is secured a pulley-depressing bar or shoe F, which projects from said plate sufficiently far to contact with the reversely-inclined upper surface of a guide G, Figs. 13 and 14, secured alongside the cable-supporting pulleys H to a rocking beam or arm L.

As fully described in my application for Letters Patent, Serial No. 402,682, filed August 14, 1890, and as shown in Figs. 14 and 15, the cable-supporting pulley H is mounted in suitable bearings in the outer forked end of a rocking beam I that has its bearings in a suitable stand $i$, and whose other end is made sufficiently heavy to keep the pulley and the cable thereon up to its normal level, while leaving said pulley free to be depressed, when required, by the shoe F on the lower jaw of the grip. The opposite ends of the shoe F are curved upwardly, as more plainly shown in Fig. 14 at $f^x$, so as to engage the inclined upper face of the guide G without shock. The rocking beam is mounted in suitable bearings carried by a frame or stand, which can readily be secured and supported within the cable-tunnel or a chamber interposed in said tunnel, as clearly illustrated in Fig. 13, according to the height at which it is required to carry the cable.

The operation of the grip is as follows: Assuming the parts to be in the position illustrated in Fig. 1—that is, with the lower jaw A in its lowest or depressed position and the cable to be running freely between the two jaws and on the cable-supporting pulleys—then if it is required to propel the car it is necessary to operate the cable-picking-up lever E—that is, to shift it into about the position indicated in Fig. 2, whereby the jaw A will raise the cable into position ready to be gripped between the movable jaw A and the fixed jaw A' by the operation of the gripping-lever D, as clearly illustrated in said figure. With the mechanical advantage obtainable with this lever E sufficient grip of the cable may be obtained (provided the main gripping-lever D has been previously placed in about the position indicated in Fig. 5) to propel the car along a fairly-level road or even up a slight incline. A tighter grip of the cable may be obtained with the main gripping-lever D, if required, owing to the increased mechanical advantage obtainable. Ordinarily I arrange the height of the cable-supporting pulleys H in the chambers C' so that the lower jaw A of the grip will pass freely over them when in its raised position—that is, when gripping the cable, as illustrated in full lines in Fig. 13. In the event of the cable being released by lowering the lower gripping-jaw A, the latter would be liable to contact with the cable-supporting pulleys H if the pulley-shoe F did not contact with the inclined guides G on the side of said pulleys, the effect of such contact being to depress such pulley, as indicated in dotted lines in Fig. 13, thus allowing the lower jaw A to pass freely over them without injury. It will be readily understood that the cable when released by the grip will rest upon the line or cable pulleys or sheaves H, instead of being supported by the lower jaw of the grip or running over sheaves or small pulleys upon the lower end of the grip itself, as is the case in some constructions of cable-grips. By this means much wear and tear of the cable and grip is prevented, and said cable is, moreover, allowed to remain comparatively straight while at work, instead of being caused to assume a "wavy" or irregular form.

It will be readily understood by all persons skilled in the art to which my invention relates that I am enabled with my improved grip to adjust the gripping-jaws at any time, even while the car is in motion, by means of the cable-lowering and picking-up lever E, instead of having to slack, back, or tighten up several set-screws and lock-nuts, as is the case with some grips. Moreover, with my improved grip I am enabled to provide sufficient opening between the gripping-jaws to allow for the passage of a "bunch" in a "stranded" rope, instead of having to stop the cable in order to release the car therefrom.

Having now particularly described and ascertained the nature of my said invention and in what manner the same is to be performed, I declare that what I claim is—

1. A cable-grip comprising a fixed gripping-jaw, a jaw having vertical motion toward and from said fixed jaw, a slide-block, a link connection between said block and the movable jaw, a lever and a crank-and-link connection between the lever and slide-block, for the purposes set forth.

2. A cable-grip comprising a fixed gripping-jaw, a jaw having vertical motion toward and from said fixed jaw, a slide-block, a link connection between the block and the movable jaw, a lifting and lowering lever, a crank-and-link connection between said lever and the slide-block, and a power-lever connected with the slide-block and adapted to impart motion thereto, for the purpose set forth.

3. A cable-grip comprising a fixed jaw, a jaw arranged below said fixed jaw and having vertical motion toward and from the same, a power-lever, a slide-block having motion in a slot of said lever, a connection between the slide-block and movable jaw, a lowering and lifting lever, and a crank-and-link connection between said lever and the slide-block, for the purpose set forth.

4. A cable-grip consisting of a fixed jaw, a jaw arranged below said fixed jaw and having vertical motion toward and from the same, and a power-lever composed of a lever-arm D and a pivoted shoe for said arm provided with a longitudinal slot, a slide-block provided with laterally-projecting journals fitted and having motion in said slot, a lifting and lowering lever, a crank-and-link connection between the last-named lever and the block, and a link connection between the latter and the movable jaw, the links connecting the block with the cranks of the lifting and lowering lever, and with the movable jaw being connected with the laterally-projecting journals of said block, for the purpose set forth.

5. A cable-grip comprising a fixed gripping-jaw, a jaw having motion toward and from said fixed jaw, said jaw being provided with a laterally and downwardly projecting shoe F, having its opposite ends curved upwardly, and means for imparting motion to said movable jaw, in combination with a cable-supporting sheave, a yielding support for said sheave, said support being provided with reverse inclined faces arranged in the path of the shoe F when the movable jaw is at the limit of its downward motion, for the purpose set forth.

In testimony whereof I affix my signature in the presence of two witnesses.

GEORGE SMITH DUNCAN.

Witnesses:
WALTER SMYTHE BAYSTON,
EDWIN WILSON.